(12) United States Patent
Kowalczyk et al.

(10) Patent No.: US 10,063,947 B2
(45) Date of Patent: *Aug. 28, 2018

(54) TELECOMMUNICATIONS MODULE

(71) Applicant: CommScope Technologies LLC, Hickory, NC (US)

(72) Inventors: Scott C. Kowalczyk, Savage, MN (US); Kok Chywn Chuang, Raleigh, NC (US); Rodney C. Schoenfelder, Shakopee, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,080

(22) Filed: Mar. 13, 2017

(65) Prior Publication Data

US 2017/0280212 A1   Sep. 28, 2017

Related U.S. Application Data

(63) Continuation of application No. 15/004,095, filed on Jan. 22, 2016, now Pat. No. 9,609,404, which is a
(Continued)

(51) Int. Cl.
  *G02B 6/00*   (2006.01)
  *H04Q 11/00*   (2006.01)
  (Continued)

(52) U.S. Cl.
  CPC ..... *H04Q 11/0067* (2013.01); *H04B 10/2504* (2013.01); *H04B 10/27* (2013.01);
  (Continued)

(58) Field of Classification Search
  CPC .. G02B 6/4452; G02B 6/3897; G02B 6/4471; G02B 6/4453; G02B 6/4454; G02B 6/00
  See application file for complete search history.

(56) References Cited

U.S. PATENT DOCUMENTS

| | | |
|---|---|---|
| 4,650,933 A | 3/1987 | Benda et al. |
| 4,768,961 A | 9/1988 | Lau |

(Continued)

FOREIGN PATENT DOCUMENTS

| | | |
|---|---|---|
| DE | 41 30 706 A1 | 3/1993 |
| DE | 202 01 170 U1 | 5/2002 |

(Continued)

OTHER PUBLICATIONS

ADC Telecommunications, Inc., DSX-3 Digital Signal Cross-Connect System Application Guide, Document No. ADCP-80-323, $1^{st}$ Edition, Issue 2, Dec. 1996, p. 1-10; p. 1-11.

(Continued)

*Primary Examiner* — Jennifer Doan
(74) *Attorney, Agent, or Firm* — Merchant & Gould P.C.

(57) ABSTRACT

A cable boot is mounted to a telecommunications module housing an optical component, wherein the cable boot extends outwardly from the module. The cable boot is mounted by axially passing the cable boot over a plurality of cables carrying fiber optic signals leading to the optical component, axially passing a portion of the cable boot through a cutout defined on a main housing of the telecommunications module, placing a boot retainer over the boot in a direction transverse to the axial direction to capture the flexible boot against movement both in the axial direction and the transverse direction, and mounting a cover on the main housing to capture the boot retainer against the main housing.

9 Claims, 12 Drawing Sheets

Related U.S. Application Data continuation of application No. 14/533,224, filed on Nov. 5, 2014, now Pat. No. 9,301,030.

(60) Provisional application No. 61/902,585, filed on Nov. 11, 2013.

(51) Int. Cl.
    *H04J 14/02* (2006.01)
    *H04B 10/25* (2013.01)
    *H04Q 1/06* (2006.01)
    *H04B 10/27* (2013.01)

(52) U.S. Cl.
    CPC .......... *H04J 14/02* (2013.01); *H04Q 1/06* (2013.01); *H04Q 11/0005* (2013.01); *H04Q 2011/0016* (2013.01); *H04Q 2011/0035* (2013.01)

(56) References Cited

U.S. PATENT DOCUMENTS

| | | | |
|---|---|---|---|
| 4,770,639 A | 9/1988 | Lau | |
| 4,797,114 A | 1/1989 | Lau | |
| 4,820,200 A | 4/1989 | Lau | |
| 4,840,568 A | 6/1989 | Burroughs et al. | |
| 5,189,410 A | 2/1993 | Kosugi et al. | |
| 5,199,878 A | 4/1993 | Dewey et al. | |
| 5,214,673 A | 5/1993 | Morgenstern et al. | |
| 5,317,663 A | 5/1994 | Beard et al. | |
| 5,339,379 A | 8/1994 | Kutsch et al. | |
| 5,363,465 A | 11/1994 | Korkowski et al. | |
| 5,393,249 A | 2/1995 | Morgenstern et al. | |
| 5,432,875 A | 7/1995 | Korkowski et al. | |
| 5,467,062 A | 11/1995 | Burroughs | |
| 5,497,444 A | 3/1996 | Wheeler | |
| 5,582,525 A | 12/1996 | Louwagie et al. | |
| 5,613,030 A | 3/1997 | Hoffer et al. | |
| 5,627,925 A | 5/1997 | Alferness et al. | |
| 5,685,741 A | 11/1997 | Dewey et al. | |
| 5,694,511 A | 12/1997 | Pimpinella et al. | |
| 5,701,380 A | 12/1997 | Larson et al. | |
| 5,717,810 A | 2/1998 | Wheeler | |
| 5,946,440 A | 8/1999 | Puetz | |
| 6,116,961 A | 9/2000 | Henneberger et al. | |
| 6,208,796 B1 | 3/2001 | Vigliaturo | |
| 6,226,111 B1 | 5/2001 | Chang et al. | |
| 6,263,136 B1 | 7/2001 | Jennings et al. | |
| 6,307,998 B2 | 10/2001 | Vigliaturo | |
| 6,328,608 B1 | 12/2001 | Olson et al. | |
| 6,363,183 B1 | 3/2002 | Koh | |
| 6,370,294 B1 | 4/2002 | Pfeiffer et al. | |
| 6,418,262 B1 | 7/2002 | Puetz et al. | |
| 6,424,781 B1 | 7/2002 | Puetz et al. | |
| 6,511,330 B1 | 1/2003 | Norris | |
| 6,532,332 B2 | 3/2003 | Solheid et al. | |
| 6,535,682 B1 | 3/2003 | Puetz et al. | |
| 6,554,652 B1 | 4/2003 | Musolf et al. | |
| 6,556,738 B2 | 4/2003 | Pfeiffer et al. | |
| 6,556,763 B1 | 4/2003 | Puetz et al. | |
| 6,579,014 B2 | 6/2003 | Melton et al. | |
| 6,591,051 B2 | 7/2003 | Solheid et al. | |
| 6,599,024 B2 | 7/2003 | Zimmel | |
| 6,614,953 B2 | 9/2003 | Strasser et al. | |
| 6,616,459 B2 | 9/2003 | Norris | |
| 6,632,106 B2 | 10/2003 | Musolf et al. | |
| RE38,311 E | 11/2003 | Wheeler | |
| 6,647,197 B1 | 11/2003 | Marrs et al. | |
| 6,668,108 B1 | 12/2003 | Helkey | |
| 6,688,780 B2 | 2/2004 | Duran | |
| 6,719,382 B2 | 4/2004 | Sucharczuk et al. | |
| 6,760,531 B1 | 7/2004 | Solheid | |
| 6,761,594 B2 | 7/2004 | Johnsen et al. | |
| 6,810,193 B1 | 10/2004 | Muller | |
| 6,822,874 B1 | 11/2004 | Marler | |
| 6,824,312 B2 | 11/2004 | McClellan et al. | |
| 6,830,465 B2 | 12/2004 | Norris et al. | |
| 6,832,035 B1 | 12/2004 | Daoud et al. | |
| 6,848,952 B2 | 2/2005 | Norris | |
| 6,850,685 B2 | 2/2005 | Tinucci et al. | |
| 6,863,446 B2 | 3/2005 | Ngo | |
| 6,885,798 B2 | 4/2005 | Zimmel | |
| 6,890,187 B2 | 5/2005 | Norris | |
| 6,937,807 B2 | 8/2005 | Franklin et al. | |
| 6,983,095 B2 | 1/2006 | Reagan et al. | |
| 7,029,322 B2 | 4/2006 | Ernst et al. | |
| 7,118,284 B2 | 10/2006 | Nakajima et al. | |
| 7,142,764 B2 | 11/2006 | Allen et al. | |
| 7,190,874 B1 | 3/2007 | Barth et al. | |
| 7,194,181 B2 | 3/2007 | Holmberg et al. | |
| 7,218,827 B2 | 5/2007 | Vongseng et al. | |
| 7,233,731 B2 | 6/2007 | Solheid et al. | |
| 7,303,220 B2 | 12/2007 | Zellak | |
| 7,310,474 B2 | 12/2007 | Kanasaki et al. | |
| 7,333,606 B1 | 2/2008 | Swam et al. | |
| 7,346,254 B2 | 3/2008 | Kramer et al. | |
| 7,376,322 B2 | 5/2008 | Zimmel et al. | |
| 7,376,323 B2 | 5/2008 | Zimmel | |
| 7,400,813 B2 | 7/2008 | Zimmel | |
| 7,418,181 B2 | 8/2008 | Zimmel et al. | |
| 7,453,706 B2 | 11/2008 | Clark et al. | |
| 7,470,068 B2 | 12/2008 | Kahle et al. | |
| 7,495,931 B2 | 2/2009 | Clark et al. | |
| 7,606,459 B2 | 10/2009 | Zimmel et al. | |
| 7,636,507 B2 | 12/2009 | Lu et al. | |
| 7,853,112 B2 | 12/2010 | Zimmel et al. | |
| 7,912,336 B2 | 3/2011 | Zimmel | |
| 8,346,045 B2 | 1/2013 | Zimmel et al. | |
| 8,634,689 B2 | 1/2014 | Zimmel | |
| 9,301,030 B2 | 3/2016 | Kowalczyk et al. | |
| 9,609,404 B2 * | 3/2017 | Kowalczyk | H04Q 11/0067 |
| 2005/0232551 A1 | 10/2005 | Chang et al. | |
| 2005/0232565 A1 | 10/2005 | Heggestad et al. | |
| 2007/0036503 A1 | 2/2007 | Solheid | |
| 2007/0147765 A1 | 6/2007 | Gniadek et al. | |
| 2009/0022468 A1 | 1/2009 | Zimmel | |
| 2011/0164854 A1 | 7/2011 | Desard et al. | |
| 2013/0114937 A1 | 5/2013 | Zimmel et al. | |
| 2013/0129298 A1 | 5/2013 | Zimmel et al. | |

FOREIGN PATENT DOCUMENTS

| | | |
|---|---|---|
| EP | 0 730 177 A2 | 9/1996 |
| EP | 0 828 356 A2 | 3/1998 |
| EP | 1 092 996 A2 | 4/2001 |
| EP | 1 107 031 A1 | 6/2001 |
| EP | 1 179 745 A2 | 2/2002 |
| EP | 1 473 578 A2 | 11/2004 |
| GB | 2 300 978 A | 11/1996 |
| JP | 2006-201584 A | 8/2016 |
| KR | 20-0385421 Y1 | 5/2005 |
| WO | WO 96/36896 | 11/1996 |
| WO | WO 00/75706 A2 | 12/2000 |
| WO | WO 02/099528 A1 | 12/2002 |
| WO | WO 02/103429 A2 | 12/2002 |
| WO | WO 03/093889 A1 | 11/2003 |
| WO | WO 2006/127397 A1 | 11/2006 |

OTHER PUBLICATIONS

ADC Telecommunications, Inc., DSX-1 Digital Signal Cross Connect PIX-DSX-1, Fifth Edition, Document No. 257, Nov. 1994, 36 pages.

ADC Telecommunications, Inc., DSX-3 Digital Signal Cross-Connect, Front and Rear Cross-Connect Products, 2$^{nd}$ Edition, Document No. 274, Oct. 2004, 66 pages.

ADC Telecommunications, Inc., OmniReach FTTP Solutions, Fiber Distribution Terminals, Document No. 1276550, May 2004, 13 pages.

ADC Telecommunications, Inc., PxPlus$^{TM}$ DS1 Digital Signal Cross-Connect, Document No. 267, Jan. 1997, 12 pages.

(56) References Cited

OTHER PUBLICATIONS

International Search Report and Written Opinion for Application No. PCT/US2014/064175 dated Aug. 19, 2015.

* cited by examiner

TELECOMMUNICATIONS MODULE

CROSS REFERENCE TO RELATED APPLICATIONS

The present application is a continuation of U.S. application Ser. No. 15/004,095, filed Jan. 22, 2016, now U.S. Pat. No. 9,609,404, which is a continuation of U.S. application Ser. No. 14/533,224, filed Nov. 5, 2014, now U.S. Pat. No. 9,301,030, which claims benefit to U.S. Provisional Application Ser. No. 61/902,585, filed Nov. 11, 2013, which applications are incorporated herein by reference in their entirety.

FIELD

The present disclosure generally relates to telecommunications equipment. More specifically, the present disclosure relates to fiber optic signal distribution modules configured for mounting in chassis.

BACKGROUND

In fiber optic telecommunications systems, it is common for optical fibers of transmission cables to be split into multiple strands, either by optical splitting of a signal carried by a single stranded cable or by fanning out the individual fibers of a multi-strand cable. Further, when such systems are installed, it is known to provide excess capacity in the installations to support future growth and utilization of the fibers. Often in these installations, modules including splitters or fanouts are used to provide the connection between transmission fibers and customer fibers. To reduce the cost and complexity of the initial installation and still provide options for future expansion, a module mounting chassis capable of mounting multiple modules may be used in such an installation.

While the chassis may accept several modules, the initial installation may only include fewer modules mounted in the chassis, or enough to serve current needs. These chassis may be configured with limited access to one or more sides, or may be mounted in cramped locations. In addition, some of these chassis may be pre-configured with the maximum capacity of transmission cables to accommodate and link to modules which may be installed in the future. Since it is desirable to have access to components within the chassis for cleaning during the installation of a new module, some provision or feature of the chassis will desirably permit a user to access and clean the connectors of these pre-connectorized and pre-installed transmission cables.

It is also desirable for the chassis to be configured to ensure that modules are installed correctly and aligned with other components within the chassis to mate with the pre-connectorized and pre-installed transmission cables.

In fiber-optic communications, it is also common for optical signals of transmission cables to be multiplexed. Wavelength division multiplexing (WDM) is a technology which multiplexes multiple optical carrier signals on a single optical fiber by using different wavelengths of laser light to carry different signals. This allows for a multiplication in capacity, in addition to making it possible to perform bidirectional communications over one strand of fiber.

Improvements in the design of such telecommunications modules are desired.

SUMMARY

The present disclosure relates to a telecommunications assembly including a chassis and a plurality of modules mounted within the chassis. Within an interior of each of the modules is located a fiber optic component. In one embodiment, the fiber optic component may be a fiber optic splitter. In another embodiment, the fiber optic component may be a fiber optic division multiplexer/demultiplexer. The modules may include one or more signal input locations at the rear of the module housing or at the front of the module housing that may be adjacent signal output locations. In the case of a multiplexer/demultiplexer, the signal input locations also act as signal output locations since the module may be configured to both demultiplex signals coming in and multiplex signals going out of the module. When the module is used as a fiber optic division multiplexer/demultiplexer module, the multiplexer/demultiplexer, as a receiver, is configured to demultiplex multiple optical carrier signals carried by the single input optical fiber into different wavelengths of laserlight as customer output signals. As a transmitter, the multiplexer/demultiplexer is configured to multiplex the customer signals, which are different wavelengths of laserlight, and combine them into a single optical fiber to be outputted from the module.

According to another aspect of the present disclosure, the module may include a main housing portion and a cover configured to enclose the main housing portion. The main housing portion may define front and rear cutouts that may be configured as signal input or signal output locations. The module may further include a removable insert that is customized based on the type of fiber optic equipment that is going to be housed within the module and the cable routing desired within the module.

The insert may be sized and configured to accommodate different types of fiber optic equipment such as fan-outs, fiber optic splitters, multiplexer/demultiplexers, combiners, filters, etc. The insert may include cable management structures such as radius limiters or spools that are designed in accordance with the cable routing needed for the types of fiber optic equipment provided in the modules.

The insert may also include features that cooperate with the cutouts of the main housing portion of the module housing for customizing the signal input and output locations. For example, the insert may include insect-infestation prevention features that align with the cutouts of the main housing portion to provide at least partial blockage of the cutouts to limit insect infestation. The insert may be configured with features to provide complete blockage of the openings defined by the cutouts if the cutouts do not need to be used for inputting or outputting signals.

Thus, the inserts provide specific customization for the modules depending upon the desired connectivity and allow for parts such as the main housing portion and the cover to be used as standard base parts for improving manufacturing efficiency.

According to one aspect of the disclosure, the module includes a flexible cable boot that is located at one of the cutouts, wherein the flexible cable boot may guide cables coming into or out of the module. The cutout defined by the main housing portion is configured such that the cable boot can be axially slid over the cables, brought toward the module from an exterior of the module along the axial direction, and placed at the cutout. A boot retainer is placed over a flange or lip defined by the boot in a direction transverse to the axial direction to capture the boot from being pulled out both in the axial direction and the transverse direction. The boot retainer is slidably placed along the transverse direction within a notch defined by the insert. The cover of the module housing is placed on the main housing portion to capture the boot retainer against the main housing portion.

According to another aspect, the disclosure is directed to a telecommunications module comprising a housing including a main housing portion and a removable cover cooperatively defining an interior, the main housing portion defining a first sidewall, a front wall, a rear wall, a top wall, and a bottom wall, the cover defining a second sidewall of the housing when mounted on the main housing portion to close off the interior, the housing defining a signal input location and a signal output location. The main housing portion defines a cutout that can be used as either the signal output location or the signal input location. An optical component is located within the interior, the optical component configured to receive a fiber optic input signal coming in from the signal input location and output a fiber optic output signal going toward the signal output location. A flexible boot defining a cable passage for inputting or outputting cables is removably mounted to the main housing portion so as to extend toward an exterior of the housing, the cable passage of the flexible boot being in alignment with the cutout, wherein the flexible boot is mounted to the main housing portion by axially passing a portion of the flexible boot through the cutout and placing a boot retainer over the boot in a direction transverse to the first sidewall so as to capture the flexible boot against movement both in the axial direction and the transverse direction. The cover is configured to capture the boot retainer against the main housing portion when mounted on the main housing portion.

According to another aspect, the disclosure is directed to a method of mounting a cable boot to a telecommunications module housing an optical component, wherein the cable boot extends outwardly from the module, the method comprising axially passing the cable boot over a plurality of cables carrying fiber optic signals leading to the optical component, axially passing a portion of the cable boot through a cutout defined on a main housing of the telecommunications module, placing a boot retainer over the boot in a direction transverse to the axial direction to capture the flexible boot against movement both in the axial direction and the transverse direction, and mounting a cover on the main housing to capture the boot retainer against the main housing.

BRIEF DESCRIPTION OF THE DRAWINGS

The accompanying drawings, which are incorporated in and constitute a part of the description, illustrate several aspects of the inventive features and together with the detailed description, serve to explain the principles of the disclosure. A brief description of the drawings is as follows.

DETAILED DESCRIPTION

Reference will now be made in detail to exemplary aspects of the present invention which are illustrated in the accompanying drawings. Wherever possible, the same reference numbers will be used throughout the drawings to refer to the same or similar parts.

FIGS. 1-6 illustrate a telecommunications module 10 having features that are examples of invention aspects in accordance with the present disclosure. In the depicted embodiment, the module 10 is a fiber optic signal distribution module that is configured for removable mounting in a telecommunications chassis, such as the chassis 12 shown in FIG. 15 of the present application.

Figure 15:
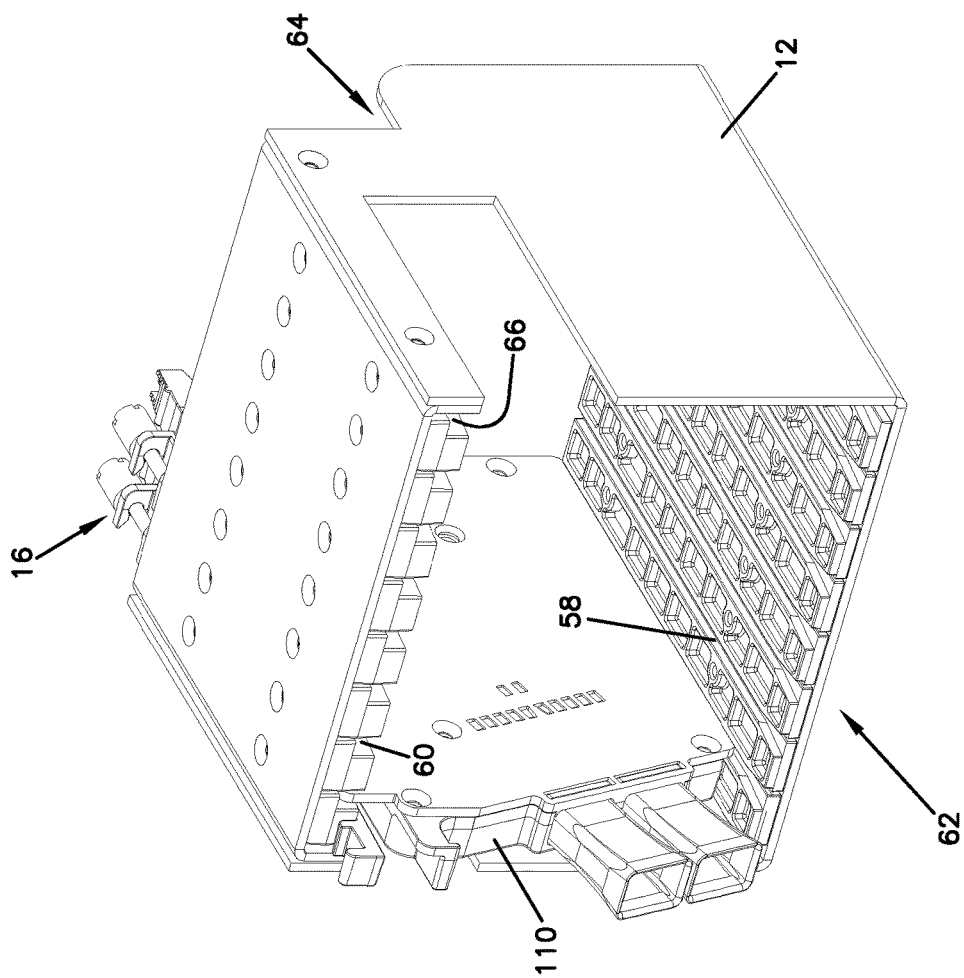
FIG. 15 illustrates a telecommunications chassis configured to removably receive the module of FIG. 1, the chassis further including an adapter assembly configured to mate with the module of FIG. 1 if the module is used as a rear-input module.

It should be noted that the chassis 12 illustrated in FIG. 15 is shown with another type of a module 110 mounted therein, wherein that module 110 is further illustrated and described in U.S. Pat. Nos. 7,536,075 and 7,885,505 incorporated herein by reference in their entireties. The features of the chassis 12 shown in FIG. 15, however, are fully applicable to the module 10 of the present disclosure. The module 10 of the present disclosure is configured to be inserted within the chassis 12 in a manner similar to that described in U.S. Pat. Nos. 7,536,075 and 7,885,505 that have been incorporated herein by reference in their entireties. As will be described in further detail below, the module 10 of the present disclosure may include fiber optic connectors that are mounted to the module housing 14 and that protrude from the module housing 14 for making a connection to adapter assemblies 16 mounted on the chassis 12. In this manner, signals may be input into the modules 10 through the connectors of the modules 10 that mate with connectors at the opposite ends of the adapters positioned on the chassis 12.

In general, the module 10 includes the module housing 14 that is defined by a main housing portion 18 and a cover 20 configured to enclose the main housing portion 18. The main housing portion 18 may define front and rear cutouts 22 configured as signal input and signal output locations as will be discussed below. The module 10, as depicted, also includes a removable insert 24 (shown in isolation in FIGS. 7-14) that is customizable based on the type of fiber optic equipment 26 to be housed within the module 10 and the cable routing desired within the module 10.

The insert 24 may be sized and configured to accommodate different types of fiber optic equipment 26 such as fan-outs, fiber optic splitters, multiplexer/demultiplexers, combiners, filters, etc. The insert 24 may include cable management structures such as radius limiters or spools that are designed in accordance with the cable routing needed for the types of fiber optic equipment 26 provided in the modules 10.

In the module 10 depicted in the present disclosure, the fiber optic equipment 26 is a multiplexer/demultiplexer and the insert 24 shown has been customized to support the multiplexer/demultiplexer 26. It should be understood that the broad inventive aspects of the present disclosure are applicable to modules that may house other types of fiber optic equipment and inserts that are configured for accommodating other types of equipment.

The insert 24 of the module 10 may also include features that cooperate with the cutouts 22 of the main housing portion 18 of the module housing 14 for customizing the signal input and output locations. For example, as will be described in further detail below, the insert 24 may include insect-infestation prevention features 28 that align with cutouts 22 of the main housing portion 18 to provide at least partial blockage of the cutouts 22 to limit insect infestation. The insert 24 may be configured with features to provide complete blockage of the openings defined by the cutouts 22 if the cutouts 22 do not need to be used for inputting or outputting signals.

Thus, the inserts 24 provide specific customization for the modules 10 depending upon the desired connectivity and allow for standard parts such as the main housing portion 18 and the cover 20 to be used for a variety of connectivity solutions to improve manufacturing efficiency.

Figure 1:
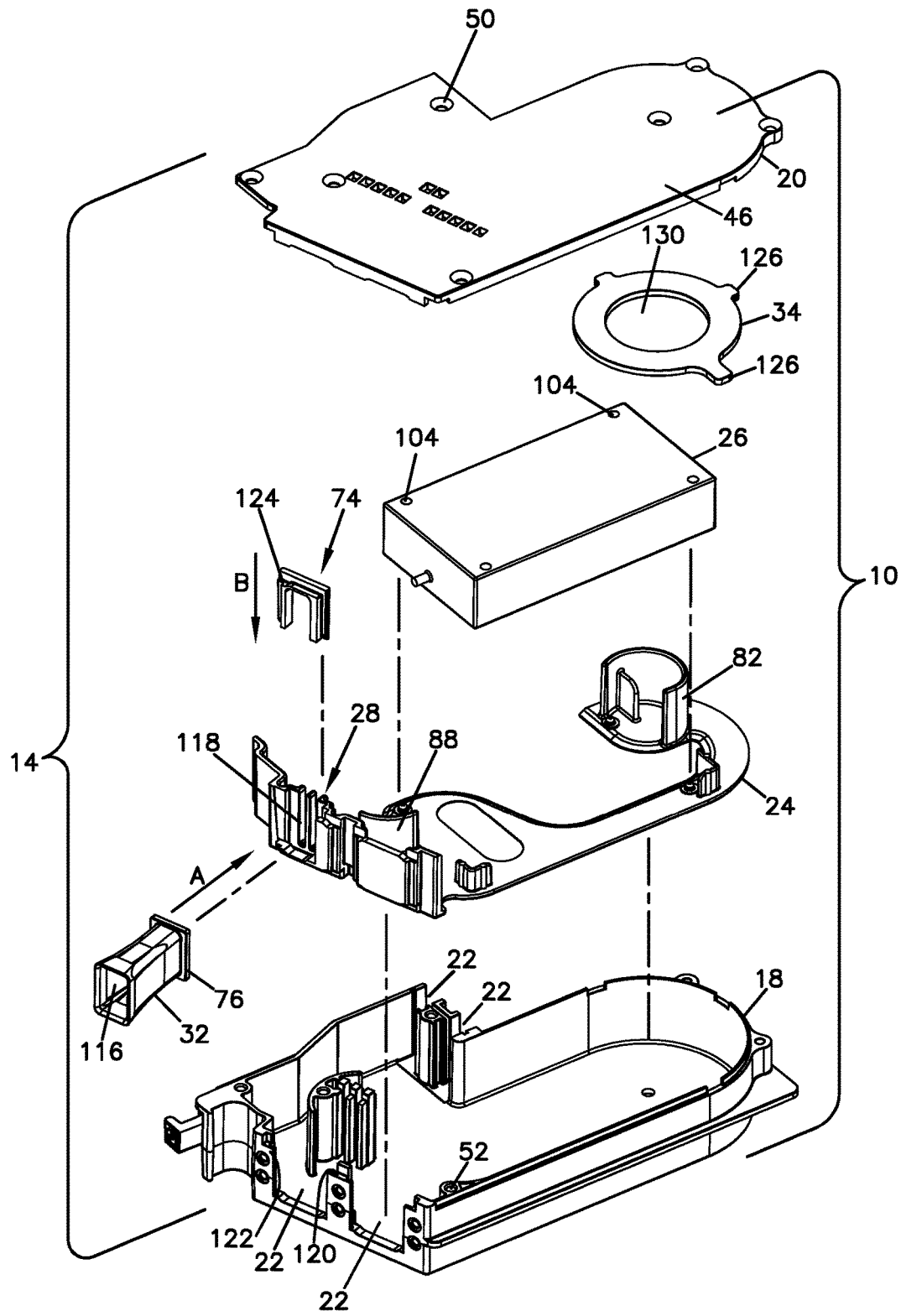
FIG. 1 illustrates an exploded front perspective view of a telecommunications module in the form of a fiber optic wavelength-division multiplexing module having features that are examples of inventive aspects in accordance with the present disclosure, the module configured to be inserted within a chassis similar to the chassis that is shown in FIG. 15.

Referring now to FIG. 1, the module 10 is shown in an exploded orientation. The module 10 includes the module housing 14 that includes a main housing portion 18 and the removable cover 20. As noted above, in the depicted example, the module housing 14 is configured to house a multiplexer/demultiplexer chip 26 therewithin for multiplexing/demultiplexing signals that may be input and output through connectors mounted on the module housing 14. In the depicted embodiment, the module housing 14 includes a cable exit 30 defined by a flexible boot 32 for relaying cables carrying fiber optic signals to customers.

The module 10, in addition the cable management/routing features provided by the removable insert 24, may itself also include a number of cable management/routing features as will be described in further detail below. One of the cable management features includes a cable retainer 34 that is removably mounted to the main housing portion 18 of the module housing 14, as shown in FIG. 1.

Referring to FIGS. 1-6, the main housing portion 18 defines a first sidewall 36 extending between a top wall 38, a bottom wall 40, a rear wall 42, and a front wall 44. Removable cover 20 defines a second sidewall 46 of the module housing 14 and closes off an open side 48 of module main housing portion 18.

Cover 20 is mounted to main housing portion 18 by fasteners through fastener holes 50 in the cover 20 and fastener mounts 52 defined on main housing portion 18. Top and bottom mounting flanges 54, 56 of the module 10 are defined by the main housing portion 18. The top and bottom flanges 54, 56 may be different in size to provide keying for the module 10. For example, the bottom flange 56 and a corresponding slot 58 on chassis 12 may be smaller in size than top flange 54 and the corresponding top slot 60 on chassis 12 (please see FIG. 15). Bottom slot 58 may be sized so that, while bottom flange 56 may be received within slot 58, the larger top flange 54 does not fit. This ensures that the module 10 is positioned within a front opening 62 of the chassis 12 in a particular desired orientation to be correctly coupled to adapter assemblies 16 mounted adjacent rear 64 of chassis at each mounting location 66.

Rear wall 42 of main housing portion 18 includes a curved portion 68 configured to provide bend radius protection to cables within interior 70 of the module 10. The rear wall 42 of main housing portion 18 includes an inset portion 72 and a pair of fiber optic connectors may be positioned at the inset portion 72 if the module 10 is used as a rear-input module. The connectors may protrude rearwardly from rear wall 42 for mating with fiber optic adapters of adapter assemblies 16 mounted within chassis 12 as described in further detail in U.S. Pat. Nos. 7,536,075 and 7,885,505 that have been incorporated by reference.

As shown in FIGS. 1-6 and 15, the front wall 44 of the module main housing portion 18 is angled with regard to the front opening 62 of chassis 12, which may aid in the direction of cables exiting the module 10 toward a desired location. In other embodiments, front walls could be made generally parallel to front 62 of chassis 12 within the scope of the present disclosure.

As noted above, the embodiment of the module 10 illustrated includes one cable exit 30 defined by a flexible boot 32 extending from front wall 44 of module main housing portion 18. As will be discussed in further detail below, the boot 32 is captured against the main housing portion 18 by a boot retainer 74 which is further captured by the to cover 20 when cover 20 is mounted to main housing portion 18. The boot 32 defines a protruding rear lip or flange 76 that is used in capturing the boot 32 against the main housing portion 18.

As noted above, the main housing portion 18 may define front cutouts or apertures 22 that may be configured as signal input or signal output locations. The flexible boot 32 is configured to align with one of the cutouts 22 to permit telecommunications cables within module 10 to be directed outside of module 10. The boot 32 is preferably sized thin enough to fit within the profile of the module 10 to preserve the density of the module 10.

Still referring to FIGS. 1-6, the main housing portion 18 includes an integrally formed flexible latch 78 (i.e., cantilever arm) that is adapted to engage a portion of chassis 12 to hold module 10 within the front opening 62 of chassis 12. Flexible latch 78 also deflects to permit withdrawal of module 10 from chassis 12. The flexible latch 78 of the module 10 is constructed similarly to those of modules discussed in U.S. Pat. Nos. 7,536,075 and 7,885,505 that have been incorporated herein by reference and operates in a similar manner for insertion and removal of the module from the chassis. The latch 78 of module 10 includes a fixed grip tab 80 opposing and adjacent to flexible latch 78 to aid removal of module 10 from chassis 12. Fixed grip tab 80 is preferably positioned on module 10 opposite latch 78 so that a user may apply opposing force on latch 78 and fixed grip tab 80 to securely grasp module 10 and remove it from chassis 12 with two adjacent fingers of the hand. The insertion of the module 10 into chassis 12 is also described in U.S. Pat. Nos. 7,536,075 and 7,885,505 that have been incorporated herein by reference.

Still referring to FIGS. 1-6, the module 10, as noted above, includes a removable insert 24 (shown in isolation in FIGS. 7-14) that is customizable based on the type of fiber optic equipment 26 to be housed within the module 10 and the cable routing desired within the module 10.

In the shown embodiment, the insert 24 includes a first radius limiter 82 that is positioned adjacent curved portion 68 of rear wall 42 of main housing portion 18 when placed within the housing 14. The first radius limiter 82 cooperates with a second to radius limiter 84 that is formed integrally with the main housing portion 18 adjacent front wall 44 of the main housing portion 18 near the upper cutout 22 defined by the main housing portion 18. The insert 24 defines a cutout 86 configured to accommodate the second radius limiter 84 as the insert 24 is placed within the main housing portion 18.

The insert 24 defines a third radius limiter 88 that is positioned adjacent the front wall 44 below the second radius limiter 84 of the main housing portion 18 when placed within the main housing portion 18. As will be discussed in further detail below, the radius limiters 82, 84, 88 provide bend-protection to fiber cables within the module 10 while providing cable management/routing functionality.

Adjacent bottom wall 40 of main housing portion 18 within the interior 70, the insert 24 defines a first guide 90 and a second guide 92 for placement of the multiplexer chip 26 within the module 10. A third guide 94 is defined by the insert 24 adjacent the first radius limiter 82 defined by the insert 24. The first radius limiter 82 defines a curved wall 96. The curved wall 96 includes a first end 98 and a second end 100. The first and second ends 98, 100 of the curved wall 96 also act as guides in positioning the multiplexer chip 26 within the module housing 14. The first, second, and third guides 90, 92, 94 and the ends 98, 100 of the curved wall 96 of the first radius limiter 82 form a frame structure around the chip 26 for positioning the multiplexer chip 26 within the interior 70 of the main housing portion 18. As shown in FIG. 1, once the multiplexer chip 26 is placed within the guides 90, 92, 94, the chip 26 is held within the module 10 against the first sidewall 36 by the removable cover 20.

In addition to the guides 90, 92, 94, as shown, the insert 24 may include alignment posts 102 that are configured to be inserted into the alignment openings 104 provided on the chip 26 for placement of the chip 26. A first post 102a is positioned by the first guide 90, a second post 102b is positioned by the second guide 92 and a third post 102c is positioned by the third guide 94. A fourth post 102d defined by the insert 24 is positioned near the cutout 86 defined by the insert 24.

Still referring to FIGS. 1-6, the module main housing portion 18 also includes integrally formed crimp holders 106 (e.g. defined by slots) adjacent the front wall 44 of the main housing portion 18 that are positioned in between the second and third radius limiters 84, 88. Crimp elements crimped to the ends of cables carrying signals that have been multiplexed/demultiplexed by the chip 26 are slidably received into crimp holders 106. Crimp elements define square flanges between which is defined a recessed portion. The crimp holders 106 include complementary structure to the crimp elements such that once the crimp elements are slidably inserted into the crimp holders 106, the crimp elements are prevented from moving in a longitudinal direction due to the flanges. Once slidably inserted, crimp elements are held in place by the cover 20 that is mounted to module main housing portion 18. Other complementary shapes between the crimp elements and the crimp holding slots 106 are also possible to provide a slidable fit and to prevent axial movement of the crimp elements once inserted into the crimp holders 106. Such crimp holders and crimp elements are shown and described in detail in U.S. Pat. Nos. 7,536,075 and 7,885,505 that have been incorporated herein by reference.

Still referring to FIGS. 1-6, if the module 10 is going to be used as a rear-input module, fiber optic connectors may slidably be inserted into cutouts 22 formed at the rear wall 42. Connectors are configured to project out from rear wall 44 at inset portion 72 of rear wall 42. It should be noted that the connectors may function both as input connectors and output connectors since the module 10 is configured to both demultiplex signals coming in and multiplex signals going out via the connectors.

The multiplexing chip 26 of the module 10 may provide a two-way signal path for the signal going through it. Input signals input through the connectors may be demultiplexed and split into different wavelengths and signals coming from the customers are multiplexed and combined into a single signal to be carried on a single fiber that is output also through the connectors. For inputting and outputting signals, an outside cable terminated by a connector may be optically connected to a connector of the module 10 through an adapter of the adapter assembly 16. This connection is established by the slidable insertion of the module 10 into a chassis 12 such as described in U.S. Pat. Nos. 7,536,075 and 7,885,505, which have been incorporated herein by reference.

According to one embodiment, the optical equipment 26 housed within the module may be a 1×4 dense wavelength division multiplexing chip. According to another embodiment, the module 10 may house a 1×8 dense wavelength division multiplexing chip 26. According to another embodiment, the module 10 may house a 1×16 dense wavelength division multiplexing chip 26. In another embodiment, the module 10 may house a coarse wavelength division multiplexing chip 26. Other types of multiplexer chips 26 are also contemplated.

As noted above, the insert 24 may include features that cooperate with the cutouts 22 of the main housing portion 18 of the module housing 14 for customizing the signal input and output locations. For example, in the depicted embodiment, the insert 24 may include insect-infestation prevention features 28 in the form of bulkheads 108 that define cutouts 112 therebetween. According to one example embodiment, the insect-infestation prevention bulkheads 108 may define cutouts 112 that are preferably sized to provide a snug fit with the output or input cables such that any extra room around the cables is limited to prevent insect-infestation. When less then all of the cutouts 112 or less than the entirety of a cutout 112 is used, the remaining space can be plugged using different types of plugs. For example, according to one embodiment, the remaining space that is not used for outputting a fiber can be plugged using a dummy fiber furcation tube assembly. The dummy fiber furcation tube assembly may include all of the components of a normal live fiber furcation tube assembly except for the fiber itself.

When the insert 24 is placed within the main housing portion 18 of the module housing 14, the insect infestation prevention bulkheads 108 align with the cutouts 22 at the front wall 44 of the main housing portion 18 to provide at least partial blockage of the cutouts 22 to limit infestation.

Referring to FIGS. 1-14, in the depicted embodiment, since only one of the cutouts 22 defined at the front wall 44 of the main housing portion 18 is being used for outputting or inputting cable, the lower cutout 22 can be covered by a portion 114 of the insert 24 when the insert 24 is placed within the main housing portion 18.

In other embodiments, wherein the lower cutout 22 may need to be used as a cable output or input, the insert 24 may provide features to accommodate a flexible boot similar to those discussed above for the upper cutout.

Figure 2:
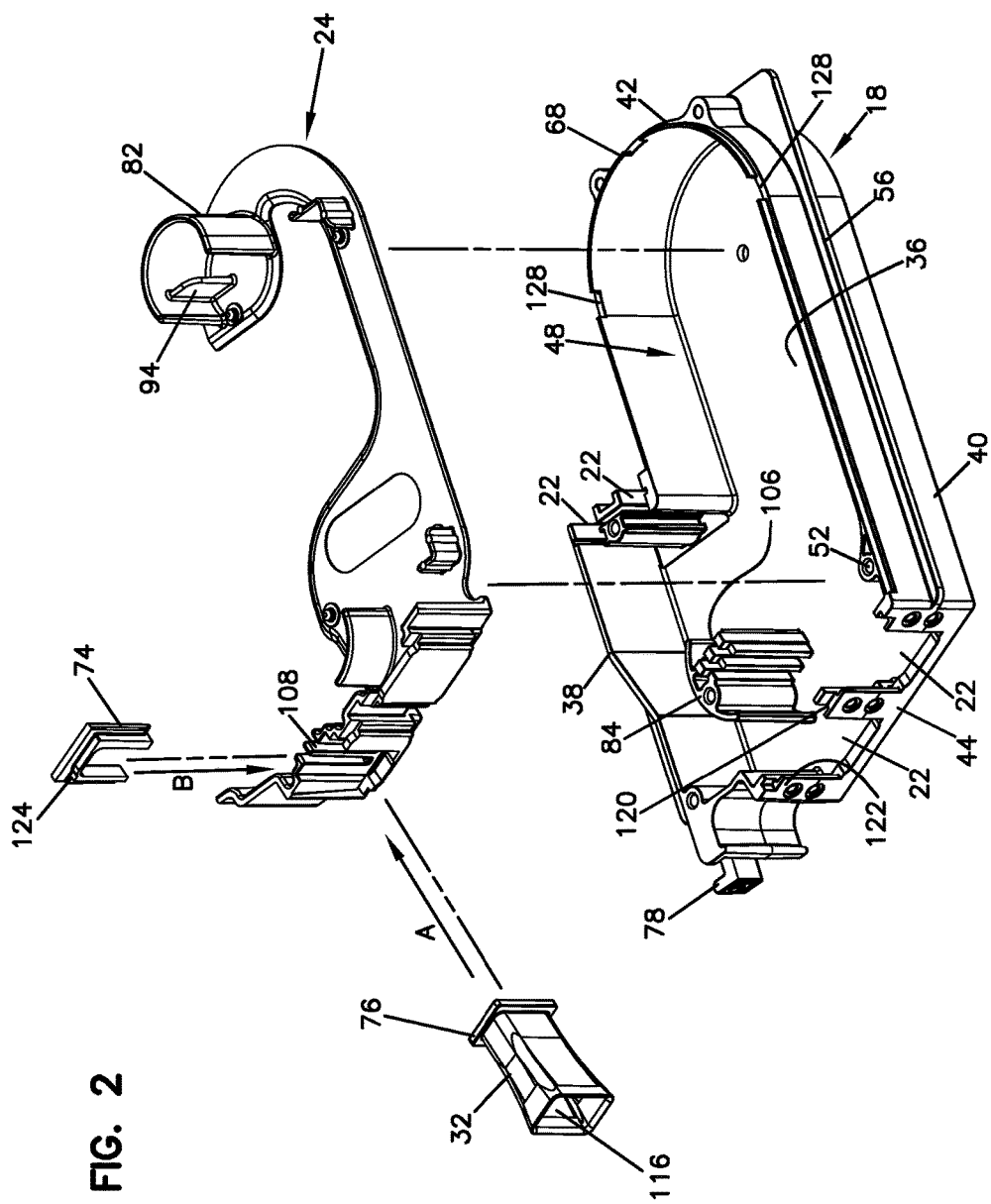
FIG. 2 illustrates the module of FIG. 1 without the cover, the optical component, and the cable retainer of the module.
Figure 3:
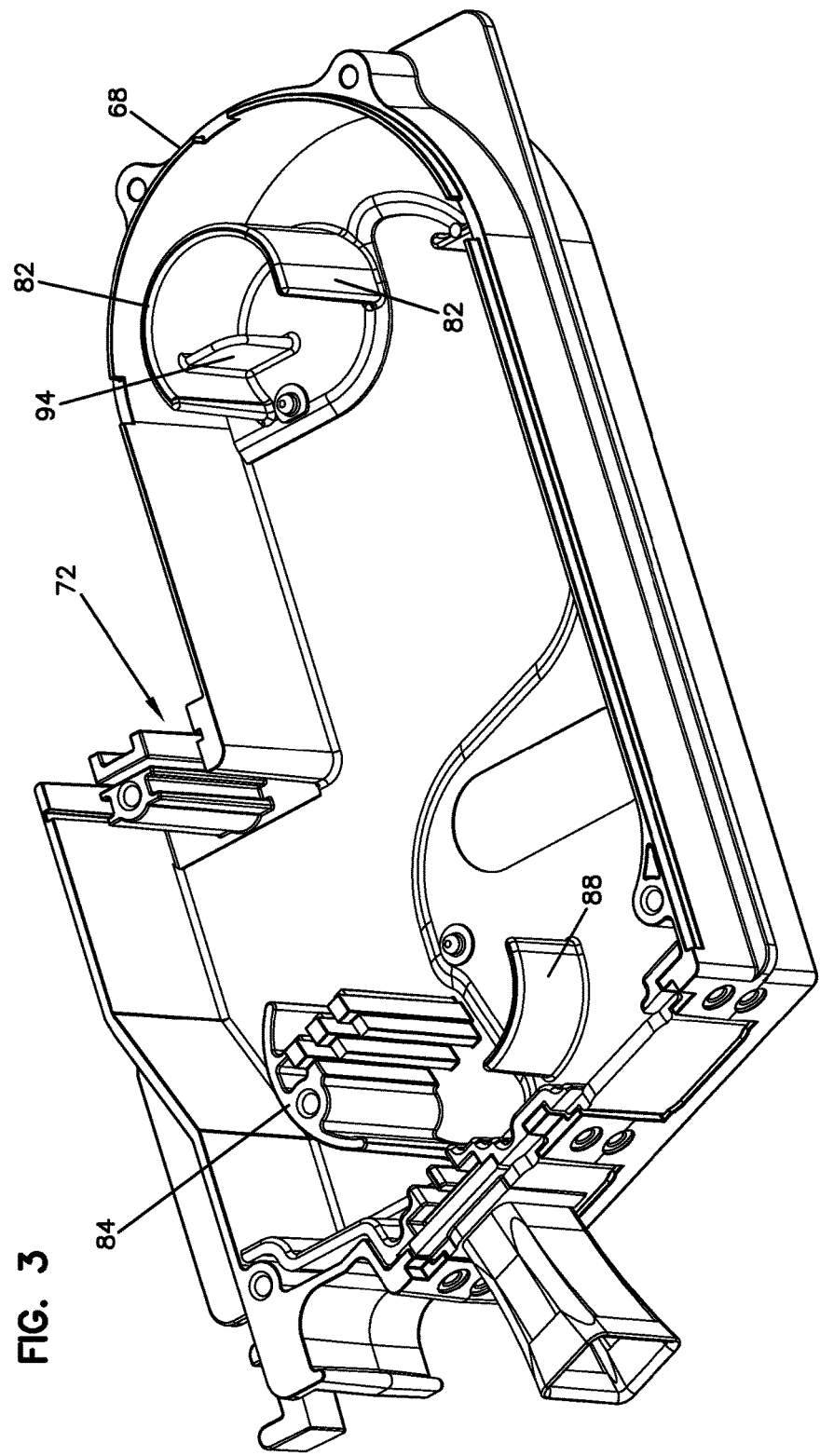
FIG. 3 illustrates the module of FIG. 2 in an assembled configuration.
Figure 4:
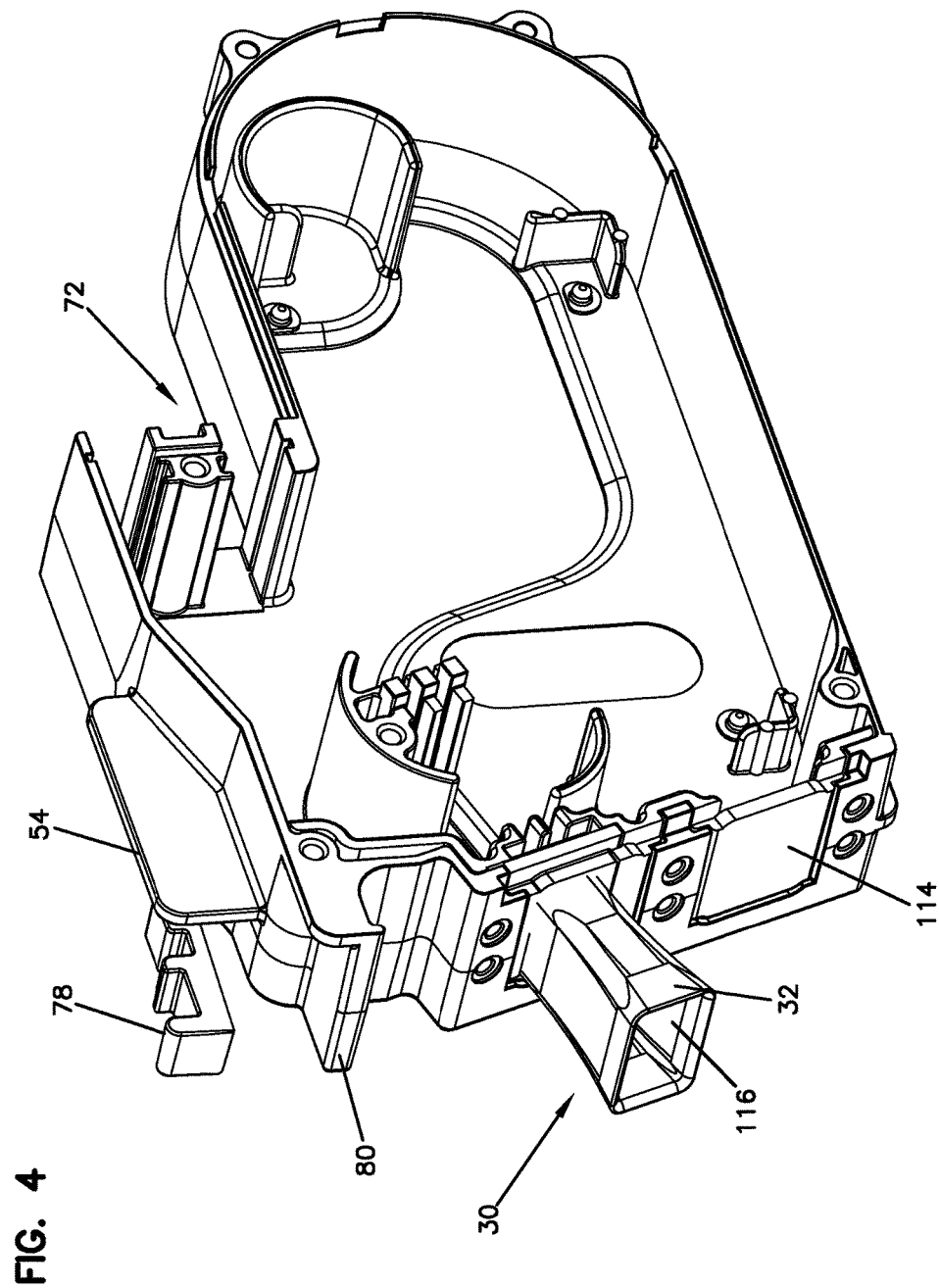
FIG. 4 illustrates another front perspective view of the module of FIG. 3.
Figure 5:
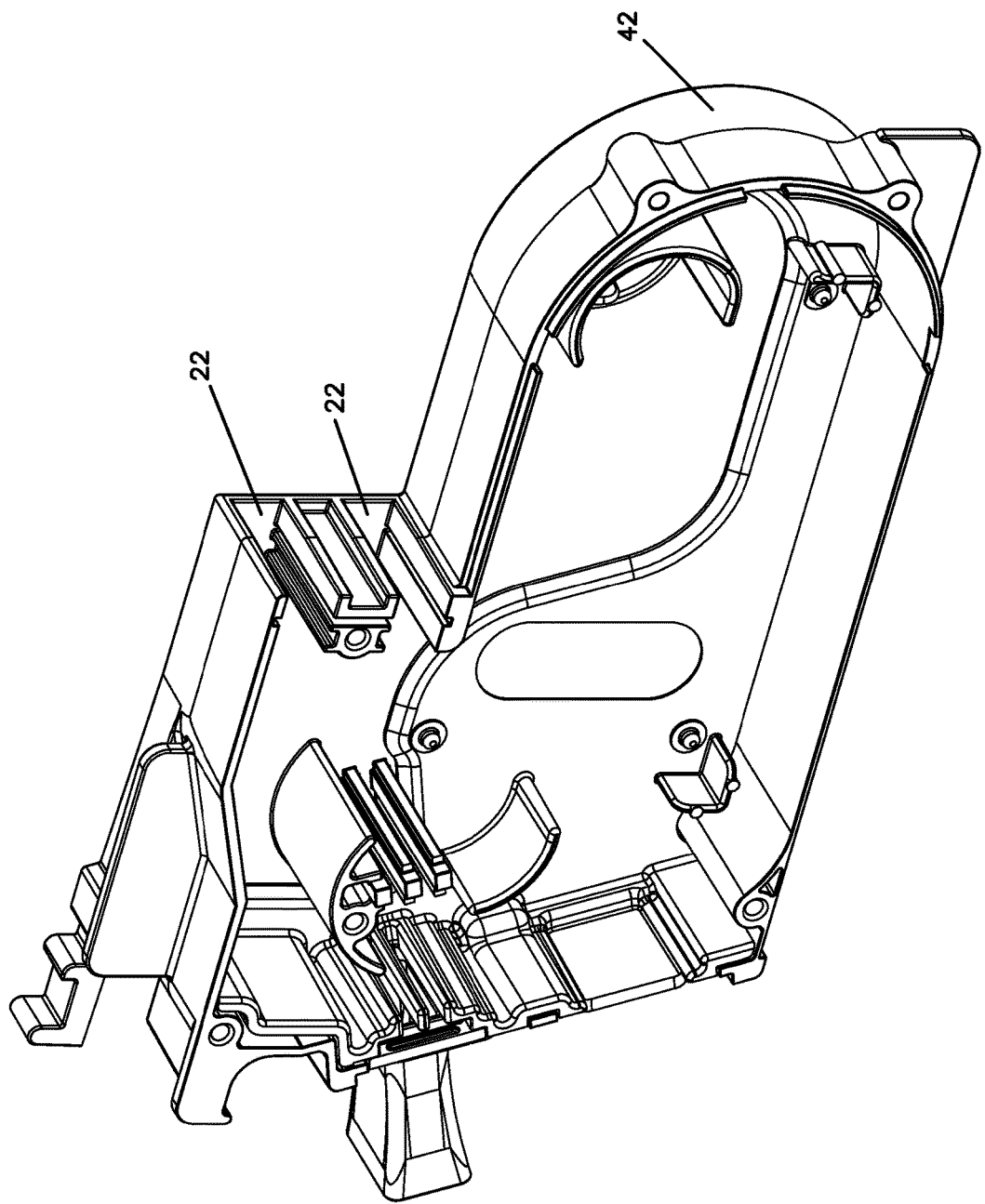
FIG. 5 is a rear perspective view of the module of FIG. 3.
Figure 6:
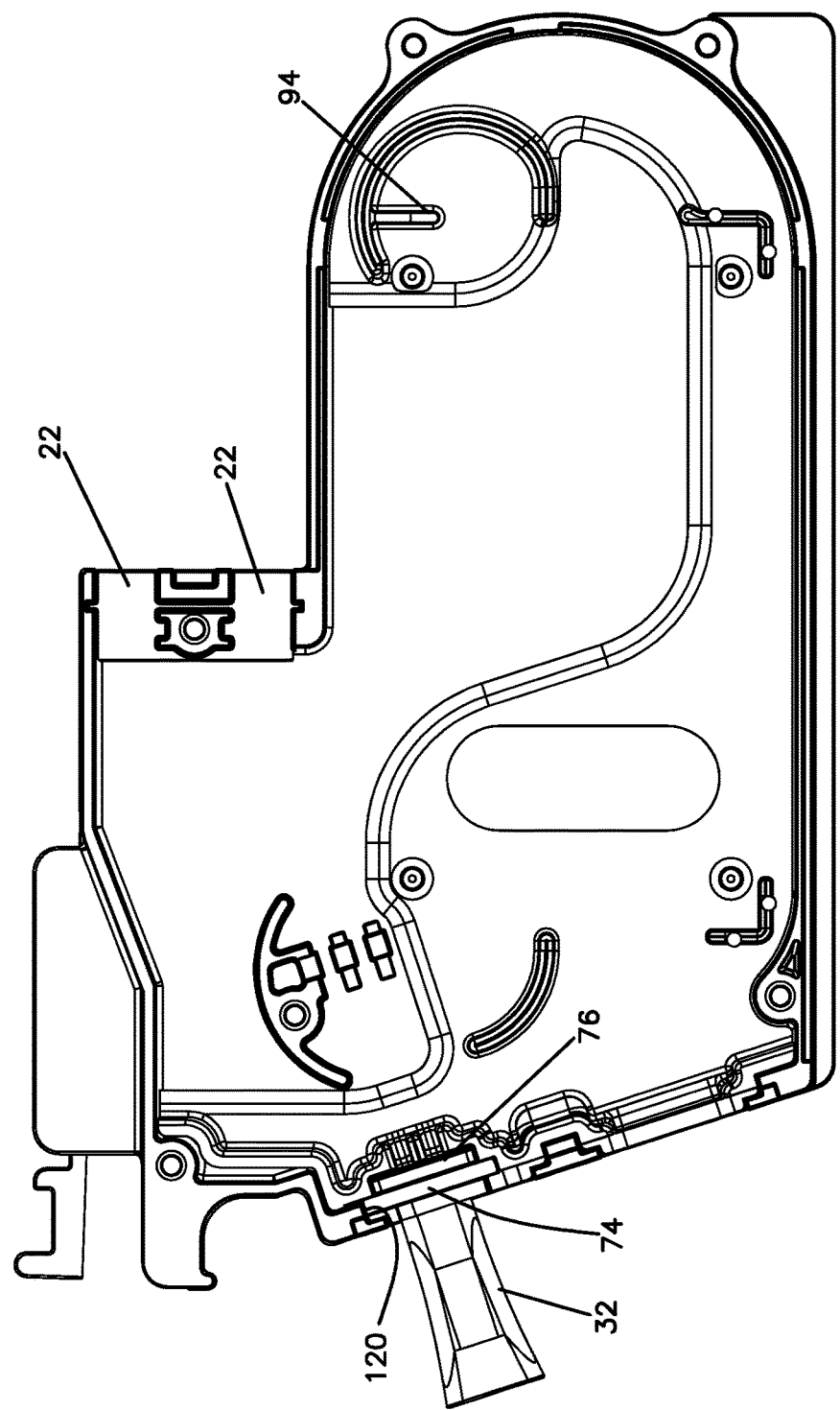
FIG. 6 is a right side view of the module of FIG. 3.
Figure 7:
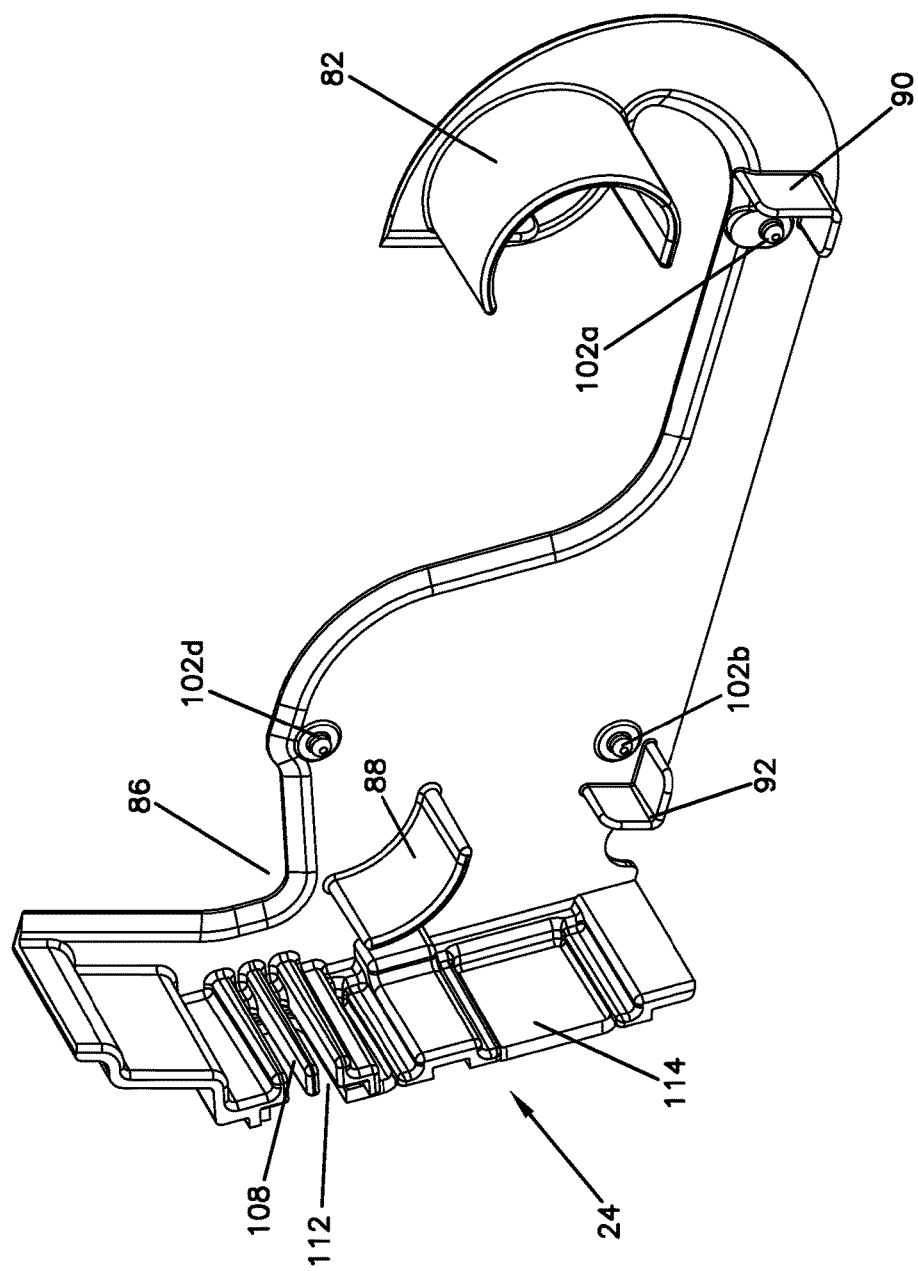
FIG. 7 illustrates a rear perspective view of an insert of the module of FIG. 1 in isolation.
Figure 8:
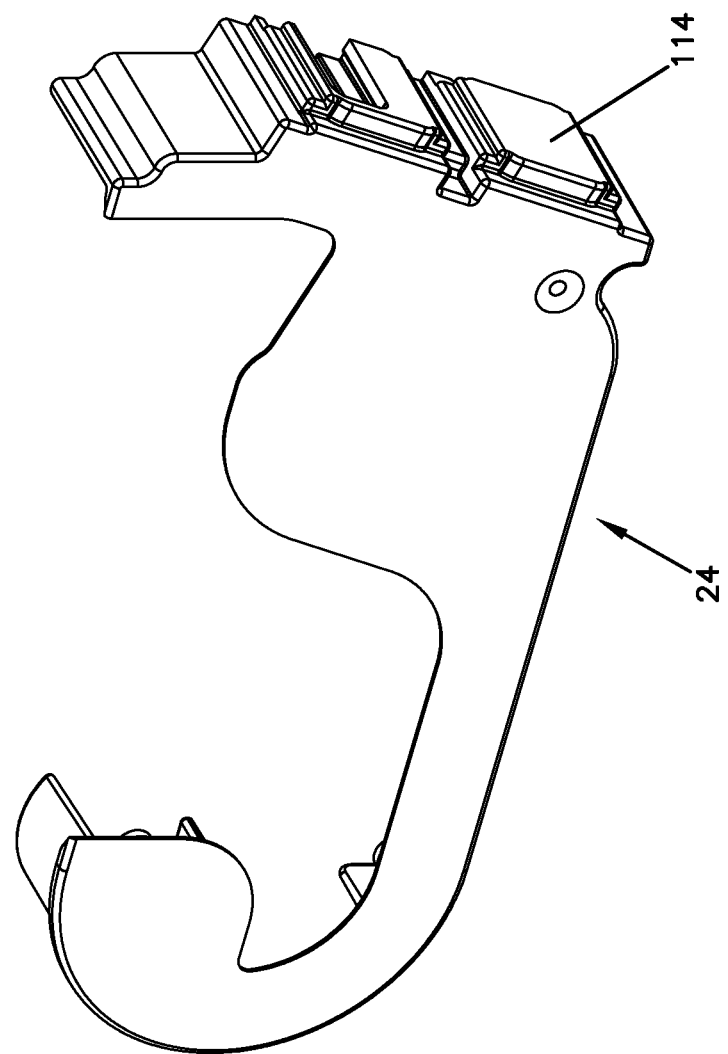
FIG. 8 is a front perspective view of the insert of FIG. 7.
Figure 9:
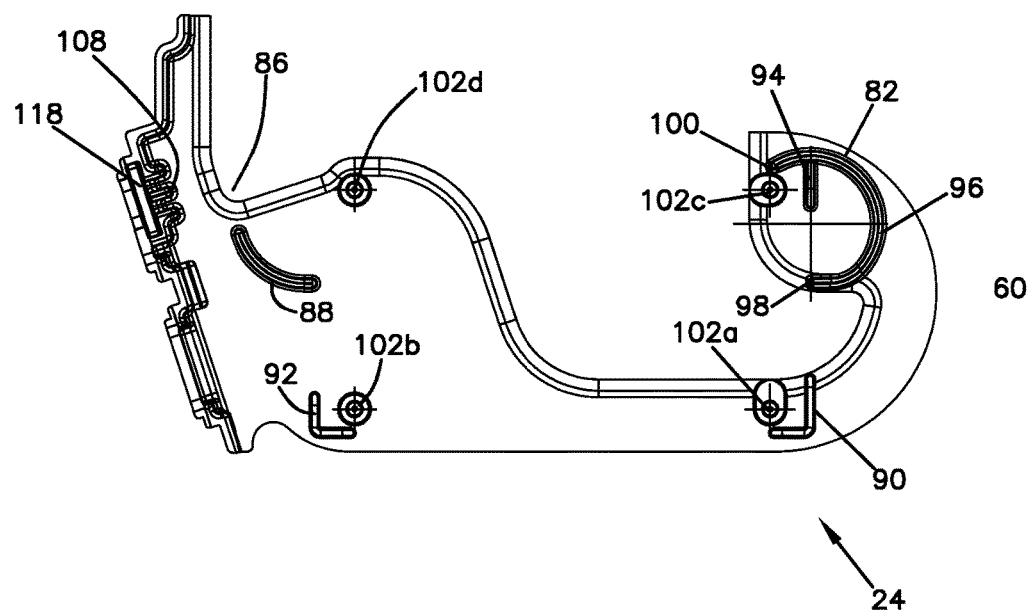
FIG. 9 is a right side view of the insert of FIG. 7.
Figure 10:
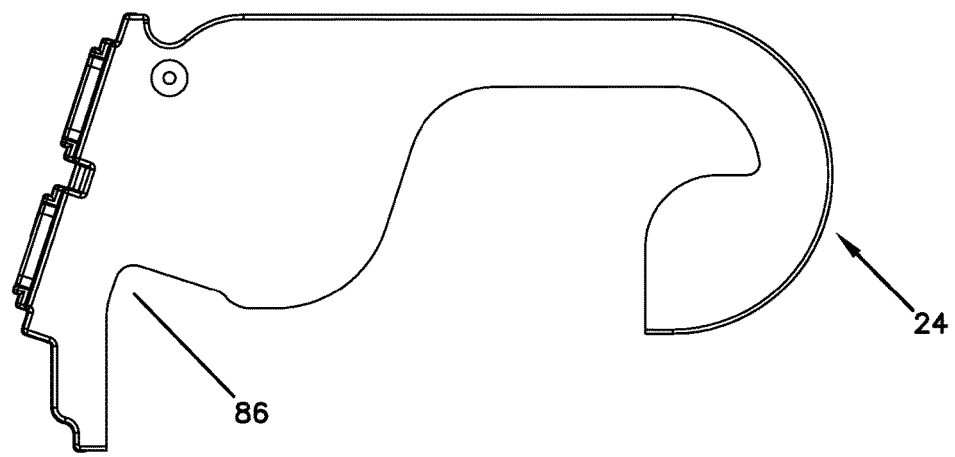
FIG. 10 is a left side view of the insert of FIG. 7.
Figure 11:
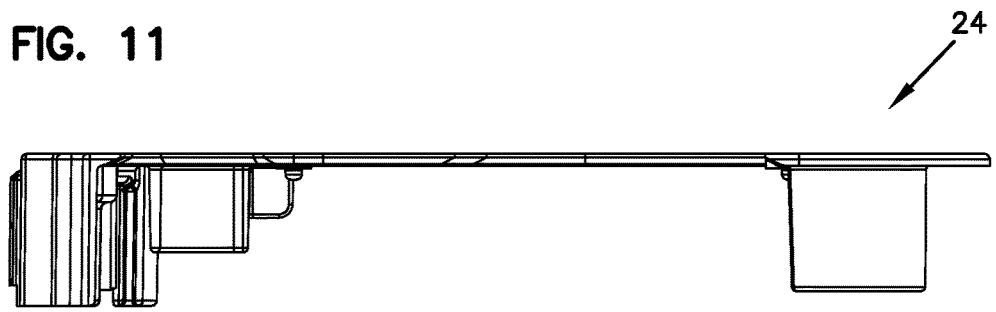
FIG. 11 is a top view of the insert of FIG. 7.
Figure 12:
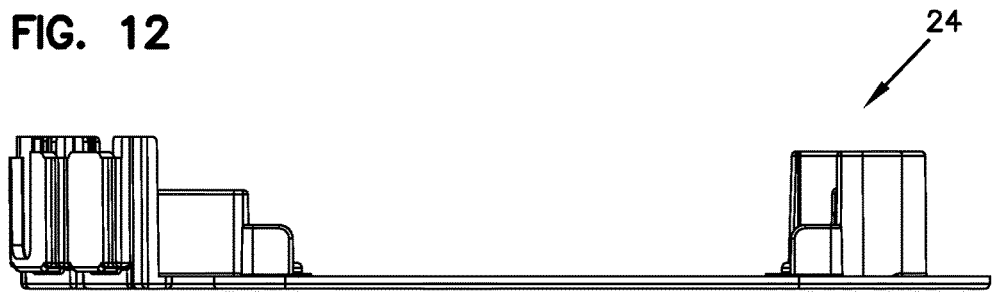
FIG. 12 is a bottom view of the insert of FIG. 7.
Figure 13:
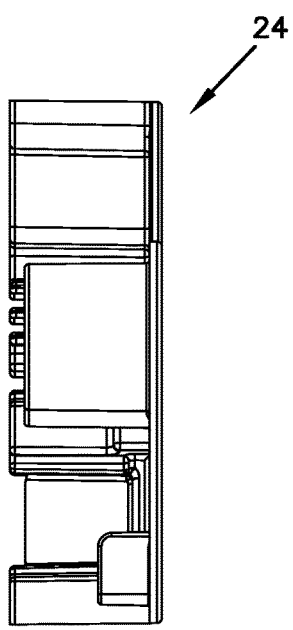
FIG. 13 is a rear view of the insert of FIG. 7.
Figure 14:
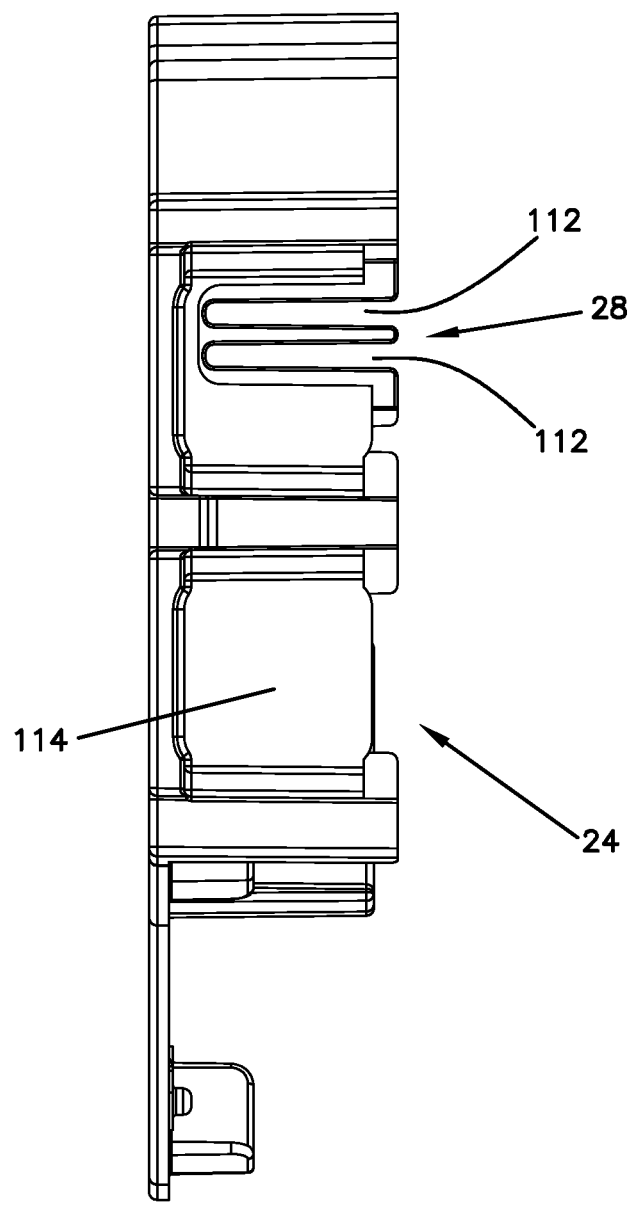
FIG. 14 is a front view of the insert of FIG. 7.

Referring to FIGS. 1-6 and 9, in the depicted embodiment of the module 10 wherein only the upper cutout 22 is used for outputting or inputting cables, the insert 24 may define features that align with the upper cutout 22 for accommodating the flexible boot 32. According to the depicted embodiment, in order to facilitate placement and/or removal of the flexible boot 32, the cutout 22 defined by the main housing portion 18 is configured such that the cable boot 32 can be axially slid over the cables, brought toward the module 10 from an exterior of the module along the axial direction A, and placed at the cutout 22, wherein a cable passage 116 defined by the boot 32 aligns with the cutout 22. In this manner, if the cables have been inserted through the boot 32, the boot 32 does not have to be lifted in a direction B transverse to the first sidewall 36 of the main housing portion 18, wherein excessive bending of the fibers may occur. In the depicted embodiment, the cutouts 22 are large enough such that the rear lip or flange 76 of the boot 32 can be axially inserted through the cutouts 22 and then placed within a notch 118 defined by the insert 24. The notch 118 is positioned in front of the insect-infestation prevention bulkheads 108 as seen in FIGS. 2 and 9. The rear lip or flange 76 of the boot 32 is moved nominally in a transverse direction B in placing the lip 76 within the notch 118.

Once the rear lip 76 of the boot 32 has been placed within the notch 118 defined by the insert 24, a separate boot retainer 74 is slidably placed over the boot 32 in a direction B transverse to the axial direction A. The boot retainer 74 is slidably placed within another notch 120 defined between the insert 24 and a portion 122 of the front wall 44 of the main housing portion 18 that surrounds the cutout 22. The boot retainer 74 defines a flange 124 that is inserted into the notch 120. Once positioned, the flange 124 defined by the boot retainer 74 abuts, on one side, an inner side of the front wall 44 surrounding the cutout 22. And, the flange 124 defined by the boot retainer 74 also abuts, on the opposite side, the lip 76 of the boot 32 to prevent the boot 32 from being pulled out in the axial direction A. The cover 20 of the module housing 14 is placed on the main housing portion 18 and captures the boot retainer 74 against the main housing portion 18 to prevent the boot 32 from being pulled out in the transverse direction B.

Thus, as described above, the inserts 24 of the modules 10 may include a variety of features and may provide specific customization of the modules 10 depending upon the desired connectivity. The inserts 24 allow parts such as the main housing portion 18 and the cover 20 to be used as base parts for a variety of connectivity solutions for improving manufacturing efficiency.

Referring back to FIG. 1, other features of the module 10 include the cable retainer 34 that may be placed on the main housing portion 18 to keep cables wrapped around the first radius limiter 82 defined by the insert 24. The cable retainer 34 is planar and includes a circular shape to match the contour of the curved portion 68 of the rear wall 42 of the main housing 18. The cable retainer 34 includes three tabs 126 positioned around the periphery. The three tabs 126 are placed within notches 128 formed around the curved portion 68 of the rear wall 42 of the main housing portion 18. The cable retainer 34 includes a circular opening 130 which accommodates the first radius limiter 82 that protrudes through the opening 130. When the cable retainer 34 is placed on the main housing portion 18, it lies flush with the main housing portion 18 and is held thereagainst by the cover 20.

FIG. 1 also illustrates the cover 20 of the module 10. The cover 20, as noted above, is configured to be fastened to the module main housing portion 18 by fasteners. The cover 20 is used to capture the fiber optic connectors (if the module is used as a rear input module), the cable retainer 34, and the boot retainer 74 once mounted to the main housing portion 18. The cover 20 may include features to align it with the main housing portion 18 in correctly positioning the cover 20 on the main housing portion 18.

The above specification, examples and data provide a complete description of the manufacture and use of the disclosure. Since many embodiments of the disclosure can be made without departing from the spirit and scope of the inventive aspects, the inventive aspects resides in the claims hereinafter appended.

What is claimed is:

1. A method of mounting a cable boot to a telecommunications module, wherein the cable boot extends outwardly from the module, the method comprising:
   axially passing a portion of the cable boot through a cutout defined on a main housing of the telecommunications module;
   placing a boot retainer over the boot in a direction transverse to the axial direction to capture the flexible boot against movement both in the axial direction and the transverse direction; and
   mounting a cover on the main housing that is separate from the boot retainer to capture the boot retainer against the main housing.

2. A method according to claim 1, wherein the boot retainer abuts a protruding lip of the flexible boot in retaining the boot within the main housing in the axial direction.

3. A method according to claim 1, wherein the boot retainer abuts a portion of the main housing surrounding the cutout to prevent the flexible boot from moving in the axial direction.

4. A method according to claim 1, wherein the telecommunications module houses an optical component and a plurality of cables extend from the module that carry fiber optic signals leading to or from the optical component.

5. A method according to claim 4, wherein the module further includes a removable insert defining a cable management structure for managing the cables extending to and from the optical component.

6. A method according to claim 1, wherein the main housing includes a flexible cantilever arm extending from the main housing for providing a snap fit connection with a piece of telecommunications equipment.

7. A method according to claim 4, wherein the module includes at least one fiber optic connector protruding from the main housing, the fiber optic connector configured to be terminated to a cable carrying a signal going to or coming from the optical component.

8. A method according to claim 4, wherein the optical component is an optical wavelength division multiplexer/demultiplexer.

9. A method according to claim 4, wherein the cable boot is axially passed over the plurality of cables extending from the module before a portion of the cable boot is axially passed through the cutout defined on the main housing of the telecommunications module.

* * * * *